(12) United States Patent
Dupont

(10) Patent No.: US 6,842,800 B2
(45) Date of Patent: Jan. 11, 2005

(54) SYSTEM AND METHOD FOR MANAGING CONFIGURABLE BUFFER SIZES

(75) Inventor: Jean-Lou Dupont, Kirkland (CA)

(73) Assignee: Marconi Intellectual Property (Ringfence) Inc., Warrendale, PA (US)

( * ) Notice: Subject to any disclaimer, the term of this patent is extended or adjusted under 35 U.S.C. 154(b) by 301 days.

(21) Appl. No.: 09/943,147

(22) Filed: Aug. 30, 2001

(65) Prior Publication Data

US 2003/0043639 A1 Mar. 6, 2003

(51) Int. Cl.⁷ ............................................. G06F 13/14
(52) U.S. Cl. ........................... 710/52; 710/54; 710/56; 710/23; 711/118; 711/137; 709/229
(58) Field of Search .......................... 710/52, 23, 72, 710/54, 56; 709/229; 711/118, 137

(56) References Cited

U.S. PATENT DOCUMENTS 6,275,877 B1 * 8/2001 Duda ........................... 710/23
6,279,077 B1 * 8/2001 Nasserbakht et al. ....... 711/118

* cited by examiner

Primary Examiner—A. Elamin
(74) Attorney, Agent, or Firm—Jones Day

(57) ABSTRACT

A buffer storage system is provided for storing groupings of data of varying size. The buffer storage system comprises a buffer storage section and a buffer management section. The buffer storage section has a first buffer subsection and a second buffer subsection. The first buffer subsection includes a plurality of buffer units of a first buffer unit size. The second buffer subsection includes a plurality of buffer units of a second buffer unit size wherein the second buffer unit size is larger than the first buffer unit size. The buffer management section is operable to determine the size of an incoming data grouping and to direct the incoming data grouping to one of the buffer subsections based on the size of the data grouping.

23 Claims, 3 Drawing Sheets

SYSTEM AND METHOD FOR MANAGING CONFIGURABLE BUFFER SIZES

BACKGROUND

1. Technical Field

The invention is related to the field of buffer storage systems. In particularly, the invention relates to buffer storage systems used to store variable-sized data.

2. Description of Related Art

Buffer storage systems are used in many networks by many types of network elements that need to temporarily store data until the network element is ready to do something with the data. In some applications, the buffer storage systems are used to temporarily store many kinds of traffic or data such as packetized data that that the network element may receive. The buffer storage systems comprise memory elements and the memory elements of the buffer storage systems are typically grouped to form a plurality of fixed sized buffer units. The buffer units are used to store groupings of data such as data packets received over the network.

Single buffer unit sizes are used in current buffer storage systems. In one type of buffer storage system, the buffer unit size is made larger than the expected size of any incoming data packet that may be stored in the buffer storage system. Therefore, each received data packet, regardless of its size, can be stored in a single buffer unit. A consequence of this type of buffer storage system is that when a small data packet is received and stored in a buffer unit, much of the memory allocated to that buffer unit may go unused.

In another type of buffer storage system, intermediate sized buffer units are used. The buffer unit size for these systems is smaller than the larger data packets and is typically equal to the smaller data packets. When this type of buffer storage system receives a large data packet, the buffer system segments the data packet into different sized portions and stores the portions in separate buffer units. The buffer storage system generates a linked list to keep track of the storage location and order of the segmented data packets so that the segmented data packets can later be recombined. When this type of buffer storage system is used, the segmented data packets must either be recombined prior to transmission of the data packets out of the buffer storage system or the linked list must be transmitted with the segmented data packets so that some other device in the network can recombine the segmented data packets in the correct order.

SUMMARY

An improved buffer storage system is provided that uses multiple buffer unit sizes for storing data or traffic. In accordance with one aspect of the invention described in the claims, provided is a buffer storage system for storing groupings of data of varying size. The buffer storage system comprises a buffer storage section and a buffer management section. The buffer storage section has a first buffer subsection and a second buffer subsection. The first buffer subsection includes a plurality of buffer units of a first buffer unit size. The second buffer subsection includes a plurality of buffer units of a second buffer unit size wherein the second buffer unit size is larger than the first buffer unit size. The buffer management section is operable to determine the size of an incoming data grouping and to direct the incoming data grouping to one of the buffer subsections based on the size of the data grouping.

DESCRIPTION OF EXAMPLES OF THE CLAIMED INVENTION

Figure 1:
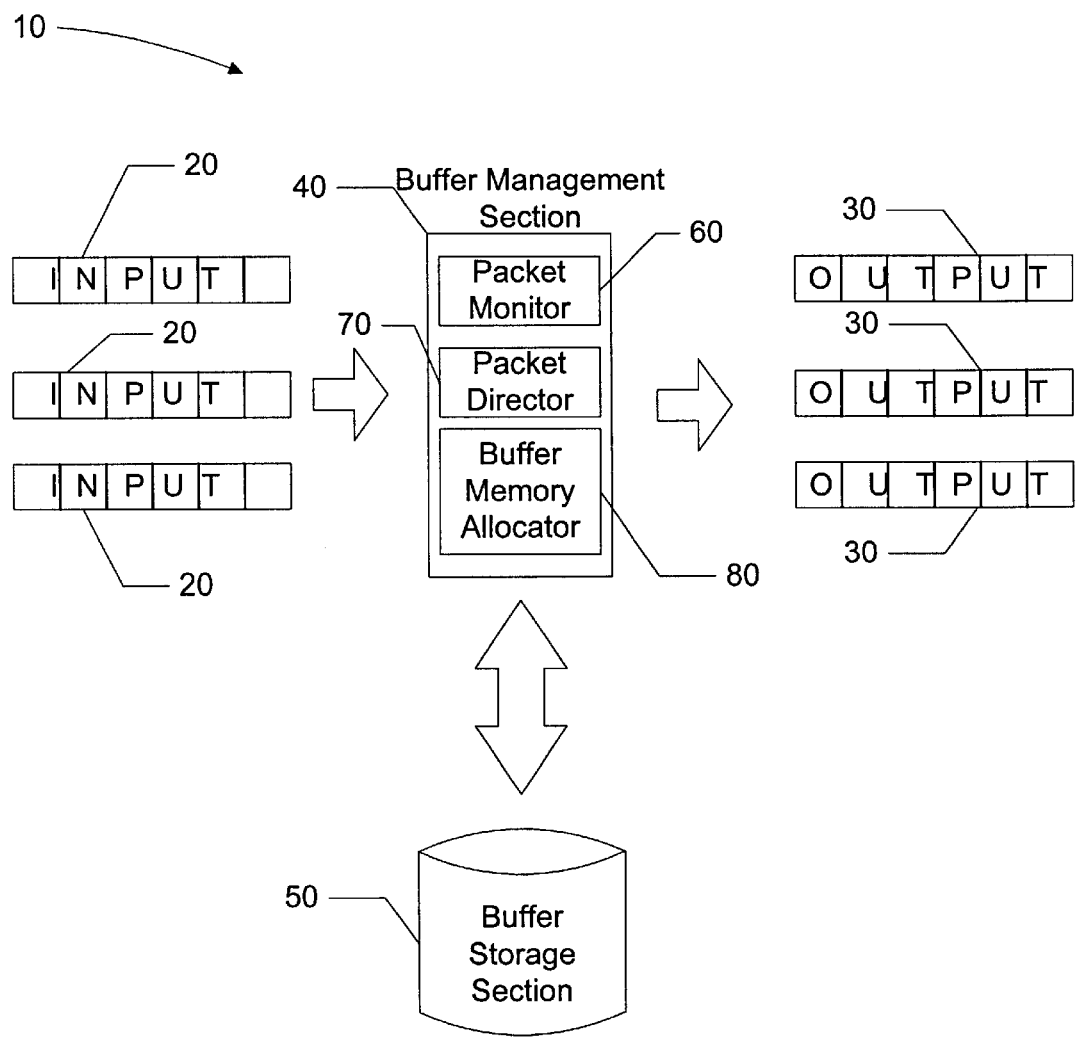
FIG. 1 is a system diagram of a preferred buffer storage system.

With reference to the drawing figures, FIG. 1 is a system diagram of an exemplary buffer storage system 10. The exemplary buffer storage system 10 may be used by a network element within a network, such as a communication network, to temporarily store some of the traffic or data handled by the network element within the network. The exemplary buffer storage system 10 comprises an input section comprising input queues 20, an output section comprising output queues 30, a buffer management section 40, and a buffer storage section 50. The input queues 20 are of conventional construction and are used to receive data to be stored in the buffer storage system. The output queues 30 are also of conventional construction and are used to transmit data out of the buffer storage system 10.

The buffer management section 40 directs data packets received at the input queues 20 into the buffer storage section 50. The buffer management section 40 also directs data packets stored in the buffer storage section 50 to the output queues 30 at the appropriate time. The buffer storage section 50 preferably comprise memory elements that may be grouped to form buffer units having particular buffer unit sizes.

The buffer management section 40 preferably comprises a packet monitor 60, a packet director 70, and a buffer memory allocator 80. The packet monitor 60 monitors and stores information regarding incoming data packets at the input queues 20. The buffer memory allocator 80 examines the data packet information obtained by the packet monitor 60 and based on that information subdivides the buffer memory section 50 into a plurality of buffer units wherein each buffer unit could have one of a plurality of fixed buffer unit sizes. The packet director 70 directs packets received at the input queues 20 into buffer units that are appropriate for the size of the receive data packets.

The preferred packet monitor 60 monitors incoming data packets to track the size of all of the data packets and to track the frequency at which specific packet sizes are received. Preferably, when a packet is received, the packet monitor 60 determines the size of the packet and increments a frequency counter for packets of that size for use in future size frequency calculations. The size frequency information may be stored in a frequency look-up table or by other suitably means.

As an alternative to tracking the frequency at which packets having specific packet sizes are received, data packet sizes may be binned so that the frequency of packets falling within particular size ranges are counted. For example, in a frequency table, the frequencies may be binned such that there are 10 different, packet-size range bins. One bin could be allocated for each of 10 different, non-overlapping packet-size ranges. The packet size ranges would collectively vary from the smallest possible packet size to the largest possible packet size. The individual packet size range for each bin could vary by the same amount for each bin or alternatively could vary by different amounts.

Alternatively, the packet monitor 60 may track packet sizes and then use a method of counting wherein data packets of specific sizes are counted. Other methods for gathering packet-size information could also be employed. The packet-size information obtained is then used by the buffer management section 40 to determine how the buffer memory 50 should be allocated.

After a data packet is received at the input queues 20 and information regarding the packet's size is obtained, the packet is forwarded to the buffer storage section 50. The packet director 70 is responsible for directing the data packet received at the input queues 20 to a buffer unit in the buffer memory 50. Preferably, the packet monitor 60 provides the packet monitor with size information regarding the current packet. The packet director then identifies the specific buffer unit to be used for storage based on the packet size information. Alternatively, the packet monitor 60 may provide the packet director 70 with the buffer unit type the packet should be stored in and leave the determination as to the specific buffer unit to be used to the packet director 70. Or, the packet director could determine the packet size, buffer unit type for use, and specific buffer unit to use without assistance from the packet monitor 60. Other variations are also possible.

Figure 2:
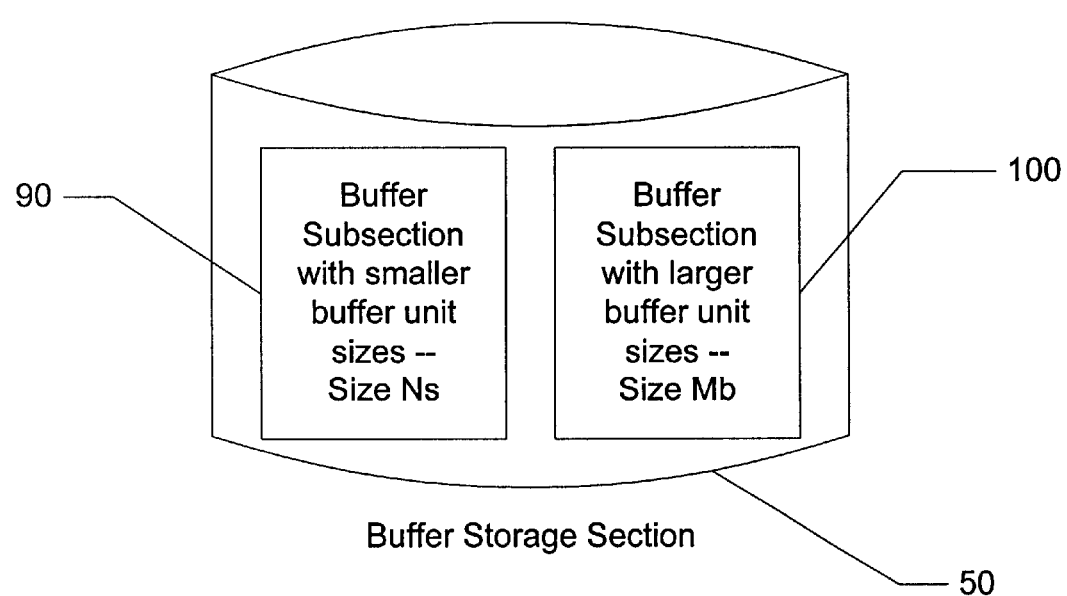
FIG. 2 is a block diagram of an exemplary buffer storage section having buffer units of two different sizes.

The buffer memory allocator 80 is responsible for allocating the buffer units of varying sizes within the buffer memory 50. The buffer memory allocator 80 uses the packet size information obtained by the packet monitor 60 to determine the number of buffer units of each type to allocate. For example, the packet monitor 60 may determine that N packets of size s, and M packets of size b have been received recently. As illustrated in FIG. 2, the buffer memory allocator 80 may then allocate the memory in the buffer storage section 50 to form N buffer units of size s 90 and M buffer units of size b 100. While this example illustrates a binary distribution of the memory space in the buffer storage section 50, the same or similar principles could be applied to sub-divide the buffer storage section 50 into more than two buffer unit sizes, in accordance with the needs of a user and the complexity of the buffer memory allocator 80.

Alternatively, the buffer memory allocator 80 may allocate the memory in buffer storage section buffer storage section 50 based primarily on the anticipated need for larger buffer units. Under this approach, the buffer memory allocator 80 first allocates sufficient memory to meet the need for larger size buffer units. Then, the remaining memory is allocated for smaller size buffer units. In another allocation scheme, the buffer memory allocator 80 first allocates memory to the buffer size units that have the greatest need, i.e., based on packet size information gathered by the packet monitor the buffer size units that have the highest frequency of occurrence. Next, the buffer memory allocator 80 allocates the remaining memory to the other buffer unit sizes.

Figure 3:
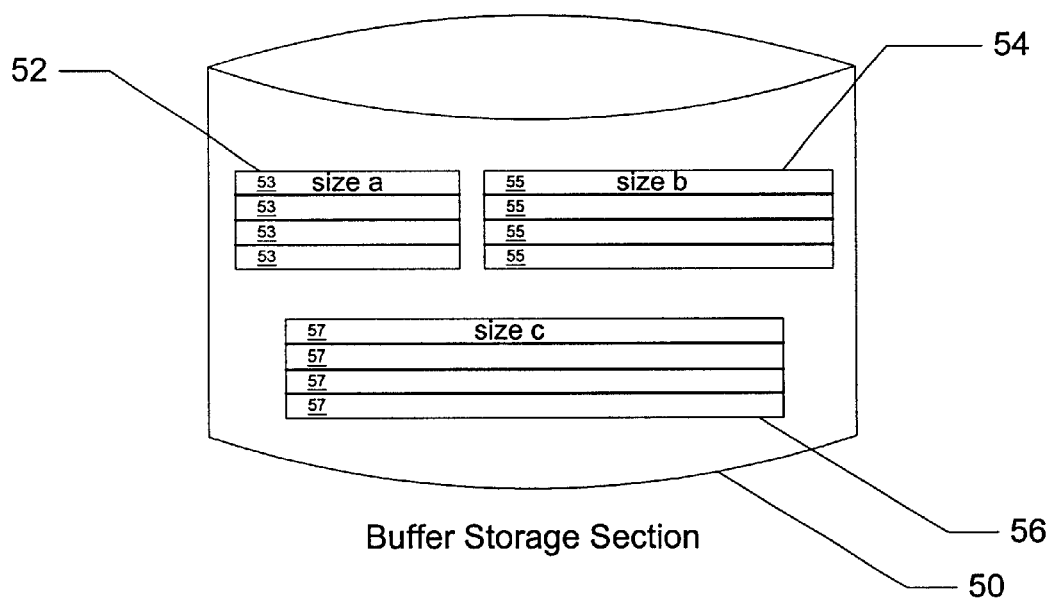
FIG. 3 is a block diagram of an exemplary buffer storage section having buffer units of three different sizes.

In the preferred buffer management section 40, the packet director 70 obtains information from the buffer memory allocator 80 to determine where to direct incoming packets. With reference to FIGS. 1 and 3, preferably, the packet director 70 obtains the size of the packet in the input queues 20 and compares the size to the size of the buffer units 53, 55, and 57 in the various buffer subsections 52, 54, and 56 in the buffer memory 50. The packet director 70 preferably directs the current packet to a buffer unit in a buffer subsection having the smallest buffer unit size that is large enough to store the entire packet. If the buffer subsection having the smallest buffer unit size that can hold the packet does not have any available buffer units, then the packet can be stored in the buffer subsection having the next larger buffer unit size.

In the example illustrated in FIG. 3, buffer memory 50 has three buffer sections. Buffer subsection 52 has a plurality of buffer units 53 of size a. Buffer subsection 54 has a plurality of buffer units 55 of size b. And, buffer subsection 56 has a plurality of buffer units 57 of size c. In this example, buffer units 57 are larger than buffer units 55 which are, in turn, larger than buffer units 53. If a packet having a size larger than size a but smaller than size b is received, the packet director 70, would preferably direct that packet to a buffer unit 55 in buffer subsection 54.

Once the network element that uses the buffer system 10 is ready to do something with the received data packets, the packet director 70 can direct the packets to the output queues 30.

Referring now to FIG. 2, a diagram of a preferred buffer storage section 50 is shown. The buffer storage section 50 has been sub-divided to include two buffer storage subsections, subsection 90 and subsection 100. Subsection 90 includes a plurality of buffer units of size s and subsection 100 includes a plurality of buffer units of size b. Subsection 90 has N buffer units thereby forming a buffer subsection of size Ns. Subsection 100 has M buffer units thereby forming a buffer subsection of size Mb.

The two buffer unit size buffer storage section 50 illustrated in FIG. 2 may be useful in common Internet switching hardware units. For example, most Internet applications use the TCP/IP protocol to share information from a server to a client, and vice versa. TCP/IP protocol implements data and control packets. Generally, data packets are large packets that include the data being requested. Control packets generally are smaller packets that include short control statements, such as an acknowledgement of receipt (ACK) or synchronization information (SYN). Thus, a buffer storage section 50 having two buffer unit sizes could be used with Internet switching hardware wherein the control packets are stored in the smaller buffer unit size buffer subsection 90 and the larger data packets are stored in the larger buffer unit size buffer subsection 100. Consequently, the small packets do not have to be stored in large buffer units that could otherwise hold a data packet, and conversely, a large data packet does not have to be segmented into a plurality of smaller segments for storage in smaller buffer units.

The embodiments described above are examples of structure, systems or methods having elements corresponding to the elements of the invention recited in the claims. This written description may enable those skilled in the art to make and use embodiments having alternative elements that likewise correspond to the elements of the invention recited in the claims. The intended scope of the invention may thus include other structures, systems or methods that do not differ from the literal language of the claims, and may further include other structures, systems or methods with insubstantial differences from the literal language of the claims.

What is claimed is:

1. A buffer storage system for storing groupings of data of varying size, comprising:

a buffer storage section having a first buffer subsection and a second buffer subsection, the first buffer subsection having a plurality of buffer units of a first buffer unit size, the second buffer subsection having a plurality of buffer units of a second buffer unit size wherein the second buffer unit size is larger than the first buffer unit size;

a buffer management section that is operable to determine the size of an incoming data grouping and to direct the incoming data grouping to one of the buffer subsections based on the size of the data grouping; and the buffer management section being operable to monitor the frequency at which data groupings of a specific size are received.

2. The system according to claim 1 wherein the data grouping is a data packet.

3. The system according to claim 2 wherein the data packet is an IP packet.

4. The system according to claim 2 wherein the first buffer unit size is substantially equal to the size of the largest control packet of the TCP/IP protocol.

5. The system according to claim 4 wherein the second buffer unit size is substantially equal to the size of the largest data packet of the TCP/IP protocol.

6. The system according to claim 2 wherein the data packet is an SONET/SDH optical data packet.

7. The system according to claim 2 wherein the data packet is an WDM data packet.

8. The system according to claim 2 wherein the data packet is an Ethernet packet.

9. The system according to claim 1 wherein the buffer management section is also operable to determine the number of first buffer units and second buffer units that are allocated in the buffer storage section.

10. The system according to claim 1 wherein the buffer management section is operable to remember information relating to the frequency at which data groupings of a particular size are stored in the buffer storage section.

11. The system according to claim 10 wherein the buffer management section determines the number of first buffer units and second buffer units to be allocated based on the remembered frequency information.

12. The system according to claim 1 wherein the buffer management section comprises a data monitor that monitors and remembers information relating to the frequency at which data groupings of a particular size are stored in the buffer storage section.

13. The system according to claim 12 wherein the data monitor records the size of the data groupings in a frequency table.

14. The system according to claim 13 wherein the frequency table comprises bins for counting data groupings having a size within a determined range.

15. The system according to claim 1 wherein the buffer management section comprises a buffer memory allocator that is operable to determine the number of first buffer units and second buffer units that are allocated in the buffer storage section.

16. The system according to claim 1 further comprising an input queue for receiving an input data grouping and an output queue for outputting a data grouping.

17. The system according to claim 1 wherein the buffer storage section has a third buffer subsection, the third buffer subsection having a plurality of buffer units of a third buffer unit size, wherein the third buffer unit size is larger than the first buffer unit size and is smaller than the second buffer unit size.

18. A system for allocating buffer memory in a packet network that transmits a plurality of differently sized packets, comprising:

means for generating a first buffer unit size;

means for allocating a plurality of first buffer units in the buffer memory wherein the first buffer units each have the length of the first buffer unit size;

means for generating a second buffer unit size;

means for allocating a plurality of second buffer units in the buffer memory wherein the second buffer units each have the length of the second buffer unit size, wherein the second buffer unit size is at least as large as the largest packet sent to the buffer memory and wherein the first buffer unit size is smaller than the second buffer unit; and means to monitor the frequency at which data groupings of a specific size are received.

19. A method for allocating buffer memory in a packet network that transmits a plurality of differently sized packets, comprising the steps of:

allocating, in the buffer memory, a plurality of first buffer units having a first buffer unit size; and allocating, in the buffer memory, a plurality of second buffer units having a second buffer unit size, wherein the second buffer unit size is larger than the first buffer unit size, and wherein the number of second buffer units allocated is based on the predicted frequency of receiving packets larger than the first buffer unit size as determined from monitoring of the frequency at which data groupings of a specific size are received.

20. The method of claim 19 wherein the packets are IP packets.

21. The method of claim 20 wherein the first buffer unit size is substantially equal to the size of the largest control packet of the TCP/IP protocol.

22. The method of claim 20 wherein the second buffer unit size is substantially equal to the largest data packet of the TCP/IP protocol.

23. The method of claim 19 further comprising the step of allocating, in the buffer memory, a plurality of third buffer units having a third buffer unit size, wherein the third buffer unit size is larger than the first buffer unit size and smaller than the second buffer unit size.

* * * * *